United States Patent [19]
Dunlevy

[11] Patent Number: 5,775,101
[45] Date of Patent: Jul. 7, 1998

[54] REFUELING DEVICE WITH FEEDBACK-CONTROLLED AUXILIARY DRIVE

[75] Inventor: F. Paul Dunlevy, Kernersville, N.C.

[73] Assignee: Beta Fluid Systems, L.L.C., Reidsville, N.C.

[21] Appl. No.: 907,547

[22] Filed: Aug. 8, 1997

[51] Int. Cl.$^6$ ................................................. F16D 31/02
[52] U.S. Cl. ............................ 60/396; 60/410; 417/47; 137/219
[58] Field of Search ................................ 60/396, 393, 325, 60/468, 410, 412; 137/899.4, 614.11, 219, 220; 222/610; 91/388; 417/46, 47

[56] References Cited

U.S. PATENT DOCUMENTS

| | | | |
|---|---|---|---|
| 1,052,619 | 2/1913 | Pickett | 417/46 |
| 2,735,717 | 2/1956 | Harman | 299/78 |
| 2,973,714 | 3/1961 | Oishei | 103/5 |
| 3,173,441 | 3/1965 | Elbogen et al. | 137/220 |
| 5,609,027 | 3/1997 | Dunlevy | 60/396 |

OTHER PUBLICATIONS

Product Advertisement for Refueling Cart, Airport Business, May 1995, p. 26.
Flyer for Refueler Cart, dated 1992–1993, Rampart, Rampmaster Modular Refueling, P.O. Box 510, Coatsville, PA 19320 USA.
U.S. Air Force Technical Manual for Part No. 015HC–Z001, prepared by Beta Systems, Inc., 1 Oct. 1975 (two pages).
U.S. Air Force Technical Manual for Part No. 062HC–Z001, prepared by Beta Systems, Inc., 15 Jan. 1981 (two pages).
1200 GPM Air–Transportable Hydrant Cart, Product Brochure of Beta Systems, Inc., approximately Feb., 1995 (sixteen pages).

*Primary Examiner*—Edward K. Look
*Assistant Examiner*—Bijan N. Karimi
*Attorney, Agent, or Firm*—William G. Dosse; Moore & Van Allen, PLLC

[57] ABSTRACT

A refueling cart, for refueling large aircraft at a major airport having pressurized fuel hydrants at loading/unloading aprons, includes auxiliary facilities on the refueling cart that are usually powered by compressed air that is obtained from compressed-air bottles carried on the cart. In order to avoid the labor and annoyance of checking and refilling the bottles of compressed air, a small air compressor is carried on the refueling cart and is powered by a hydraulic motor that is in turn powered by the flowing pressurized fuel. A variable-flow valve is placed in the path of the fuel flowing from a hydrant to the airplane. The pressure generated across the variable-flow valve by the flowing fuel pushes some of the fuel in a path that bypasses the variable-flow valve. That bypass path includes the hydraulic motor, and the bypassing fuel at the pressure difference generated by the variable-flow valve drives the fluid motor. The fluid motor, in turn, drives the air compressor. The pressure of the compressed air available on the refueling cart is fed back to control the variable-flow valve to adjust the speed of the hydraulic motor and air compressor in order to maintain the pressure of the compressed air on the refueling cart between a desired minimum pressure and a desired maximum pressure.

11 Claims, 3 Drawing Sheets

CONNECTED TO
UNDERGROUND
FUEL MAIN

REFUELING DEVICE WITH FEEDBACK-CONTROLLED AUXILIARY DRIVE

FIELD OF THE INVENTION

The present invention relates generally to fueling systems, usually for fueling airliners at busy airports; and it relates more particularly to a fuel-flow-powered, feedback-controlled drive for powering auxiliary equipment used in connection with a fueling system.

BACKGROUND OF THE INVENTION

When fueling large airplanes at the loading/unloading aprons of major airports, fuel is usually supplied at substantial pressure by underground mains to fuel hydrants located at each apron. A fuel cart is rolled up to the airplane and is hooked between the nearest fuel hydrant and the fuel filler connection on the airplane.

The cart performs several services ancillary to providing and transferring fuel. For example, a fuel cart has hose reels, filters, water separators, and a flow meter to measure the quantity of fuel boarded, for billing. Many of these and other ancillary services require the availability of a quantity of compressed air. This is customarily provided by compressed-air storage bottles carried on the cart, which are a nuisance to check often and recharge. It would be more convenient if the air could be compressed right on the cart without the weight, noise, and inconvenience of an on-board engine or the added complexity and safety risk of an electrical connection near the fume-laden apron.

There has been some use of the pressurized flow of the fuel from the hydrant to the airplane in order to run some ancillary fueling services. One example is using a fluid motor driven by the flow of pressurized fuel obtained from the apron hydrant and delivered to the airplane in order to drive a fuel-additive injector.

In fueling an airplane, the fuel flow is not constant. It slows greatly as the tank nears full. The resulting variable fluid motor output is quite acceptable for a fuel-additive injector which should operate at a rate commensurate with the rate of fuel flow.

In order to obtain a constant-speed output from a fluid motor, U.S. Pat. No. 5,609,027, granted on Mar. 11, 1997, to F. Paul Dunlevy, discloses using a spring-biased restricting valve in the main fuel-flow path to produce a constant pressure drop across the restricting valve in the presence of a variable flow rate. A fluid-driven motor connected across the resultant constant-pressure source provides a constant-speed shaft output to drive an auxiliary air compressor on the refueling cart at a constant speed during the entire fueling operation.

However, in some applications, instead of a fluid-flow-driven, constant-pressure, constant-speed shaft drive for an air compressor, an auxiliary air compressor drive for a refueling cart is desired which is maximized when air pressure is low and is minimized when air pressure is high.

SUMMARY OF THE INVENTION

It is an object of the present invention to provide a feedback-controlled auxiliary drive for a refueling device.

In accordance with the present invention, a portable device for refueling self-propelled vehicles from a fixed, pressurized fuel source provides a pressure difference within the flowing fluid for driving a fluid motor for powering an auxiliary instrumentality at a speed that is dependent upon the feedback of a measured parameter of the instrumentality's requirements, all on the portable device.

In accordance with another aspect of the present invention, a portable refueling device is provided with auxiliary mechanical power from motor means in response to the flow of fuel, with pressurized fuel being conveyed to the motor means by source means from the higher pressure side of a pressure generating means which generates a pressure difference that depends upon the feedback of a measure of the need for the auxiliary mechanical power, all in response to a wide range of rates of flow of the fuel.

In accordance with still another aspect of the present invention, a portable refueling device is provided with an air compressor that is driven by a hydraulic motor that is supplied with pressurized fuel, while lower-pressure fuel from the outlet of the hydraulic motor is passed to a lower-pressure portion of the fuel path, the pressure difference in the fuel path being maintained by the flow of fuel through a feedback-controlled, variable-flow valve, the restriction of which is controlled by the air pressure present in a compressed-air reservoir, which is pressurized by the air compressor.

BRIEF DESCRIPTION OF THE DRAWINGS

A more complete understanding of the present invention will be had from the following detailed description when considered in conjunction with the accompanying drawings, wherein the same reference numbers refer to the same or corresponding parts shown throughout the several figures, in which.

DETAILED DESCRIPTION OF THE PREFERRED EMBODIMENT

Figure 1:
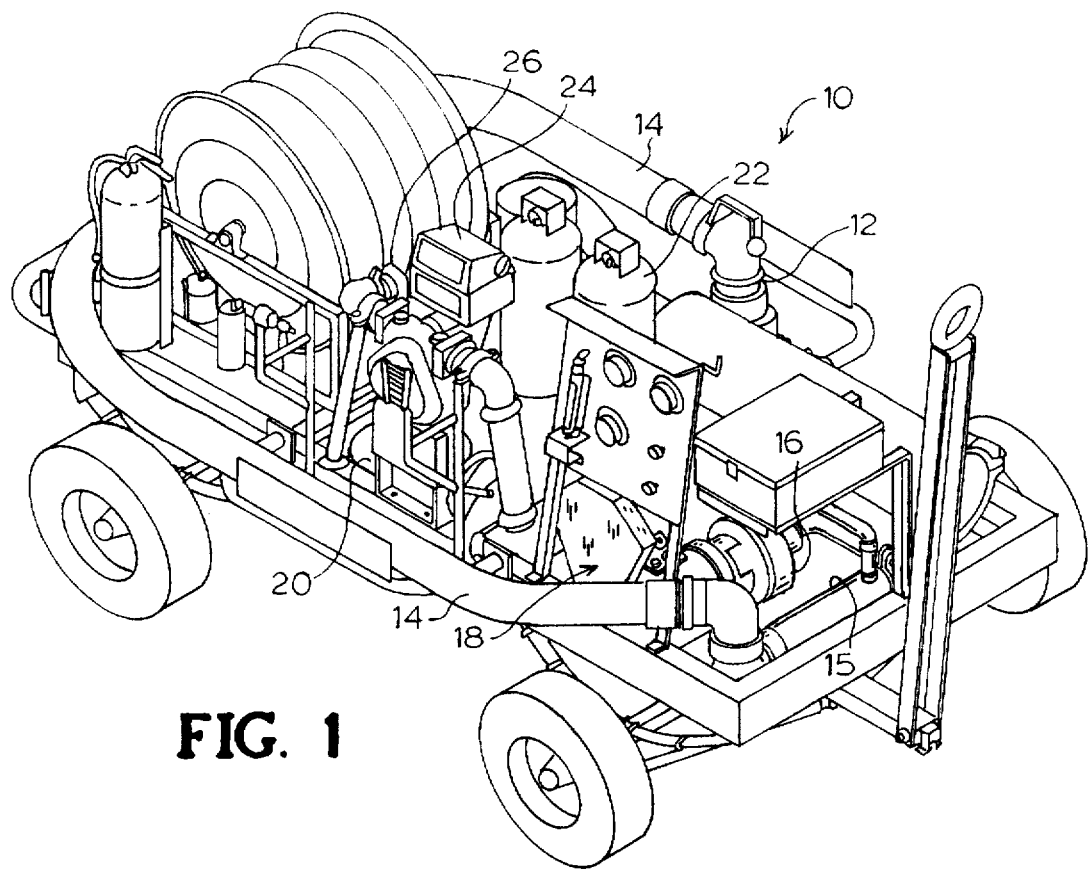
FIG. 1 is an overall, perspective view of a typical airport refueling cart but incorporating the present invention.

Referring now to the drawings and particularly to FIG. 1, a refueling cart 10 embodying the present invention is generally illustrated. Such refueling carts are generally wheeled and are pulled about from one loading/unloading apron to another around the airport, as needed to refuel airplanes.

When conveniently positioned on an apron, a hydrant coupler 12 is removed from the refueling cart 10 and is connected to a pressurized refueling hydrant (not shown) at the apron. Airplane fuel under substantial pressure is available at the refueling hydrant. The hydrant coupler 12 is connected to one end of a flexible hose 14 that conveys the fuel from the hydrant to the piping and apparatus of the refueling cart. When the refueling cart is being transported from one apron to another, the flexible hose 14 is stored compactly (as illustrated in FIG. 1) about the refueling cart 10.

Figure 2:
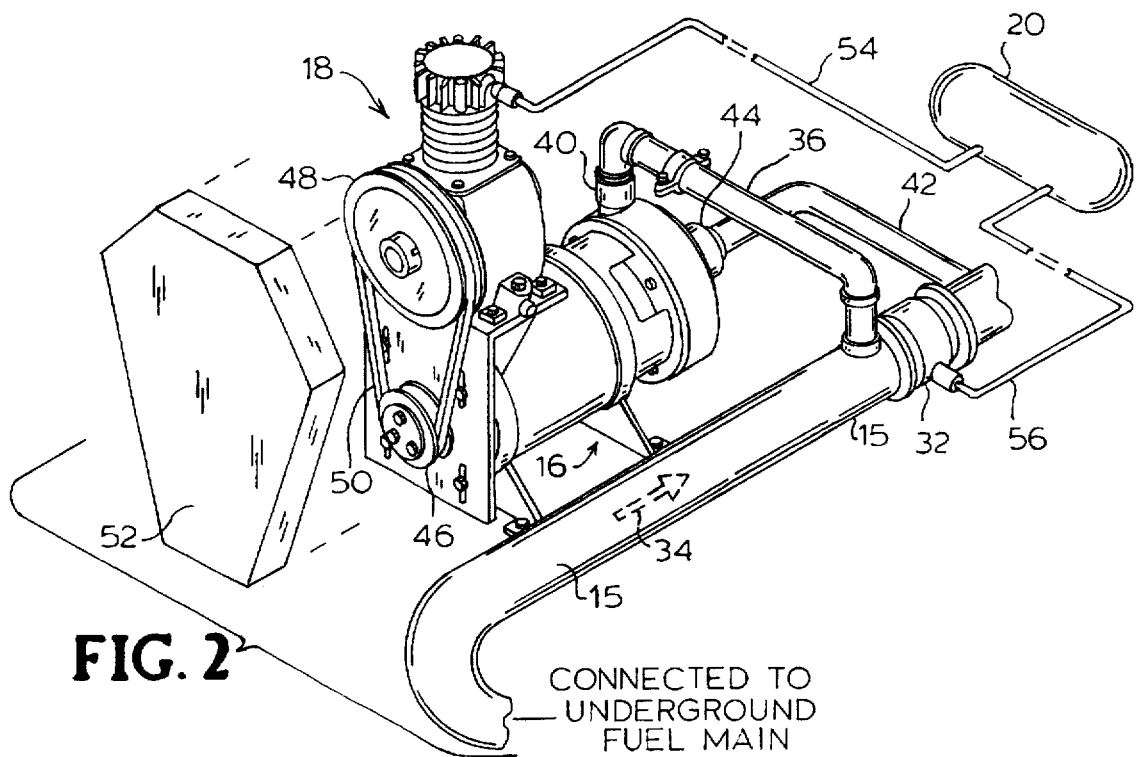
FIG. 2 is a partial perspective view showing a more detailed portion of the refueling cart using the present invention.

Pressurized fuel in the flexible hose 14 first flows through an inlet pipe 15 having a commercially-available, pressure-feedback-controlled variable-flow valve (not shown in FIG. 1), which is shown in FIG. 2 and which is described more fully below in connection with FIGS. 3 and 4. A suitable variable-flow valve is available from the Ground Fueling Products Division of Whittaker Controls, Inc., 8311 Sorenson Avenue, Santa Fe Springs, Calif. 90670-2199, U.S.A.

A source bypass pipe (just barely visible in FIG. 1, but shown and more fully described below together with a fluid motor, a sink bypass pipe, and an air compressor, in connection with FIG. 2) carries some of the fuel from upstream of the variable valve to the input of a fluid motor 16. A sink bypass pipe (also just barely visible in FIG. 1 but shown in and described in connection with FIG. 2) carries the fuel from the outlet of the fluid motor back to the inlet pipe 15 but downstream of the variable valve. In this way, the pressurized fuel that bypasses the variable-flow valve drives the fluid motor 16.

The flow of fuel through the variable valve, on its way to the airplane, generates a pressure difference across the variable valve. As described more fully below, in connection with FIG. 2, that pressure difference drives the bypass fuel around the variable valve, through the source and sink bypass pipes, and through the fluid motor 16 to drive the output shaft of the fluid motor. The output of the fluid motor 16 drives an air compressor 18 to compress air for delivery to a compressed-air tank or reservoir 20 on the refueling cart 10.

The fuel also passes through or is carried past the other conventional components of the refueling cart 10, such as a pressure surge suppresser 22, a fuel quantity meter or register 24, and various control valves 26, to the rotating, sealed input of a hose reel. A fueling nozzle (not shown) on the outer end of the reeled length of hose is then attached to the fuel input connectors of the airplane (not shown).

Referring now to FIG. 2, the inlet pipe 15 has the variable-flow valve 32 (see also FIGS. 3 and 4) placed in series in the inlet pipe 15. An arrow 34, in FIG. 2, illustrates the direction of fuel flow in the inlet pipe 15.

A source bypass pipe 36 extends from the inlet pipe 15 and carries fuel from the inlet pipe upstream of the variable valve 32 that is inside of the inlet pipe 15. The other end of the source bypass pipe 36 is connected to the fluid input 40 of the fluid motor 16. A sink bypass pipe 42 conveys fuel from the fluid outlet 44 of the fluid motor back to the inlet pipe 15, but downstream of the variable valve 32.

Therefore, as fuel flows in the inlet pipe 15, that fuel flowing through the variable valve 32 generates a pressure differential across the variable valve. Therefore, fuel in the inlet pipe 15 upstream of the variable valve 32 is at a higher pressure than the fuel in the inlet pipe downstream of the variable-flow valve.

Consequently, that pressure differential across the variable-flow valve 32 forces fuel to try to bypass the variable-flow valve, through the source bypass pipe 36, through the hydraulic motor 16, and through the sink bypass pipe 42 back to the inlet pipe 15. That pressure differential and resultant flow of fuel through the hydraulic motor 16 causes rotation of the output shaft (not shown) of the hydraulic motor. That output shaft of the hydraulic motor 16 is connected to and turns a drive pulley 46.

The drive pulley 46 rotates a driven pulley 48 by means of a drive belt 50. The driven pulley 48 is connected to the drive shaft (not shown) of the air compressor 18, an auxiliary instrumentality on the refueling cart, for utilizing the mechanical output power of the fluid motor 16. A protective pulley cover 52 (shown exploded from the pulleys 46 and 48 in FIG. 2) partially obscures the compressor 18 in the view of the refueling cart 10 depicted in FIG. 1. The air compressor 18 is conventional and is commercially available.

Rotation of the driven pulley and the drive shaft of the air compressor 18 causes the air compressor to compress air and propel that compressed air down a compressed-air pipe, tube, or air line 54 to the compressed-air reservoir 20 (FIG. 1). The compressed air in the reservoir 20 is thus available for conventional refueling-cart auxiliary devices that require compressed air.

Briefly a hydraulic motor can be considered as a hydraulic pump operating in reverse. That is, instead of rotating power being supplied externally to the shaft of a pump to move liquid under pressure, the reverse occurs. The moving, pressurized liquid rotates the shaft of the hydraulic motor. Such hydraulic motors are conventional and commercially available.

While air compressors are conventionally operated by a constant-speed rotary shaft input, most types of air compressors can readily operate over a wide range of input shaft speeds. At lower shaft speeds, the air compressor merely compresses air more slowly.

The demand for compressed air on a refueling cart is not necessarily constant. Also, the pressure of the compressed air can usually be allowed to vary somewhat. In order to accommodate and exploit these variables, the operation of the air compressor can be controlled over a wide range speeds by controlling the flow-controlling operation of the variable-flow valve 32 in order to maintain the pressure of the compressed air within a reasonably narrow range. To accomplish such control of the variable-flow valve 32, a second air line 56 is extended from the compressed air tank 20 to the valve 32 for feedback control of the variation of the variable-flow valve.

Figure 3:
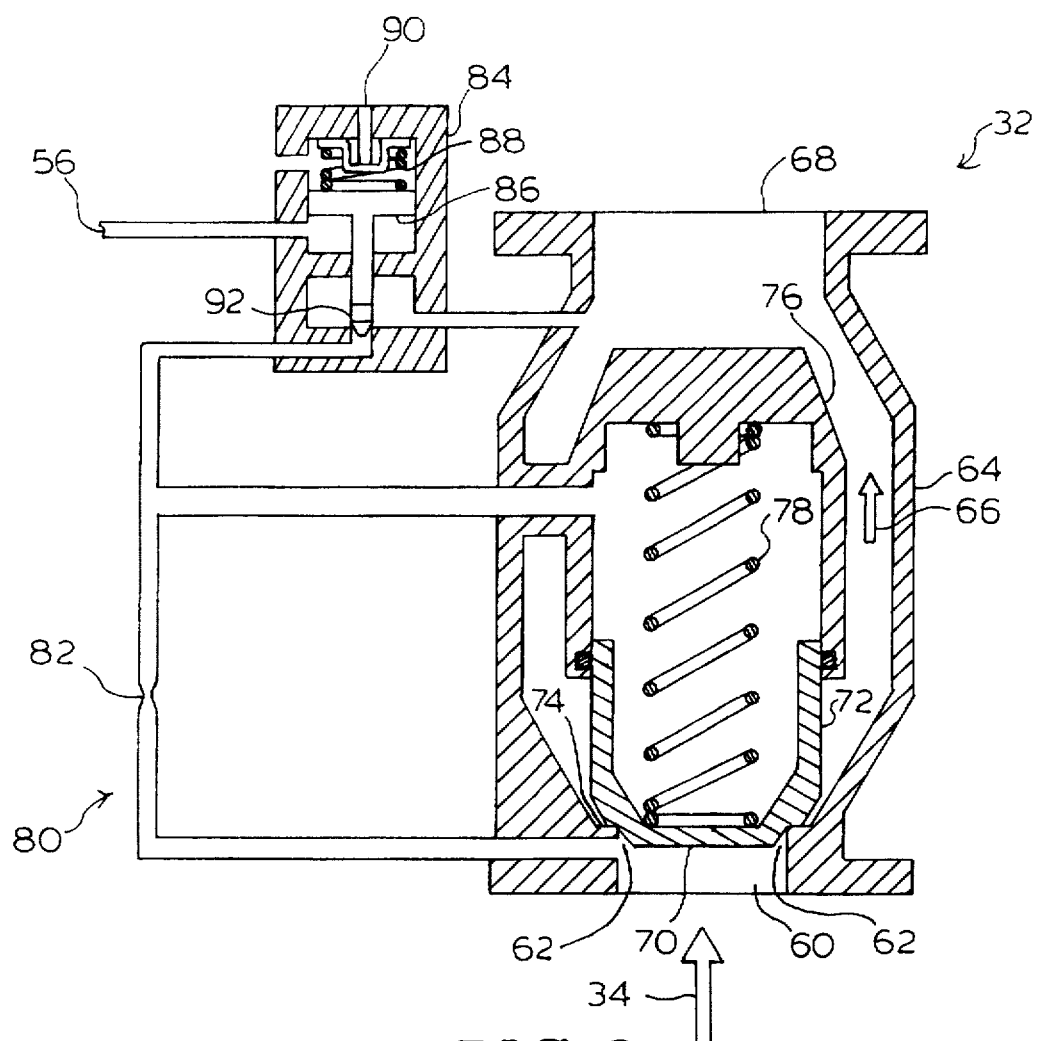
FIG. 3 is a schematic, cross-sectional view of a commercial pressure-feedback controlled, variable-flow valve shown in a nearly closed position in response to the feedback of a low pressure.

Referring now to FIG. 3, the variable-flow valve 32 is shown schematically in cross section. In FIG. 3, the valve 32 is shown in a nearly-closed, highly constrictive state, for illustration purposes. In this condition, a minimum amount of fuel flows through the valve 32. A maximum amount of fuel flows through the hydraulic motor 16. Therefore, air is being compressed a maximum rate by the compressor 18. In the normal operation of a refueling cart 10, a maximum rate of air compression is desired when the air pressure in the compressed air tank 20 is at a minimum.

Fuel flowing in the direction of the arrow 34 in FIG. 2 enters an entry port 60 of the valve 32 and proceeds through an annular, variable-constriction region 62 and then through the body 64 of the valve in the direction of an arrow 66 to the outlet port 68 of the valve. The variable-constriction region 62 is formed by the gap between the lower end or face 70 of a piston 72 and a seat 74 at the inlet end of the valve 32. A cylinder 76 is formed as an integral part of the body 64 of the valve 32 or is rigidly attached to the body of the valve 32. A spring 78 biases the piston 72 toward the seat 74 to close the valve 32.

Even a modest pressure on the piston 72 in opposition to the bias of the spring 78 is sufficient to lift the piston 72 off of the seat 74 and allow fuel to flow through the valve 32. However, there is a bleed path 80 (integral with the variable-flow valve 32, as sold by the manufacturer) for fuel to pass from upstream of the seat 74, past a restriction 82, and to the inside of the piston 72 and cylinder 76, largely to equalize the pressure on both sides of the face 70. When the pressure of the fuel on both sides of the seat 70 of the piston 72 is essentially equalized, the flow area of the constriction region 62 is minimized. Maximum constriction of the constriction region 62 maximizes the constriction of the flow of fuel through the valve 32 and thus maximizes the pressure across the hydraulic motor 16, and thus the rate of air compression.

A bleed valve 84 (also integral with the variable-flow valve 32, as sold by the manufacturer) is connected between the bleed path 80, downstream of the restriction 82, and the outlet port 68 of the valve 32. When the bleed valve 84 is substantially closed, as shown in FIG. 3, there is negligible or no pressure drop across the restriction 82, and the fuel pressure on both sides of the face 70 of the piston 72 remain largely equalized, allowing the spring 78 to keep the piston 72 substantially in the position shown in FIG. 3.

Figure 4:
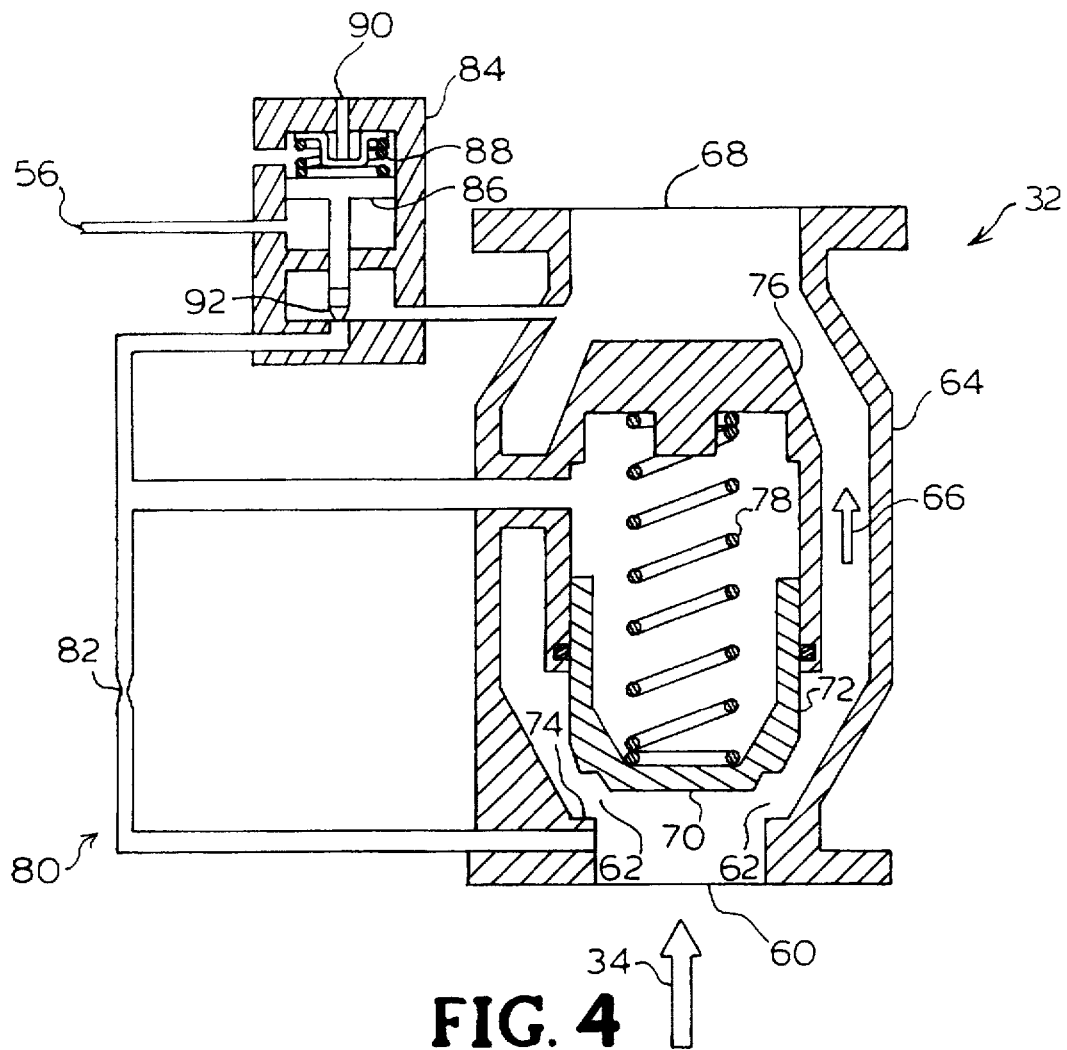
FIG. 4, is a schematic, cross-sectional view of the commercial pressure-feedback-controlled, variable-flow valve of FIG. 3 but with the valve shown in an open position in response to the feedback of a high pressure.

Referring now to FIG. 4, when the pressure of the air in the compressed air tank 20 has risen sufficiently, that pressure is communicated through the air line 56 to the bleed valve 84. Air pressure within the bleed valve 84 presses against the lower face of a piston 86, opposing a bias spring 88. The bias spring 88 is preloaded by an adjusting screw 90 to keep the bleed valve from opening if the air pressure is the minimum pressure deemed necessary for the proper operation of the refueling cart 10.

When the pressure of the compressed air inside the compressed air tank 20 increases above that minimum pressure, it begins to push a piston 92 against the bias of the spring 88 and slightly opens a needle valve 92. The more that the needle valve 92 opens (with increasing air pressure on the lower face of the piston 86), the more fuel bleeds through the bleed valve 84 to the lower pressure of the outlet port 68. Fuel bleeding through the bleed valve 84 causes a pressure drop across the restriction 82, which reduces the pressure on top of the lower face 70 of the piston 72.

With decreasing pressure above the lower face of the piston 72, the piston 72 rises, enlarging the flow area of the variable-constriction region 62. The resulting reduced constriction of the variable-flow valve 32 reduces the pressure differential between its inlet port 62 and its outlet port 68. That also reduces the fuel pressure across the hydraulic motor 16, thereby slowing the air compressor 18. Slowing the air compressor 18 reduces the flow of compressed air to the compressed air tank 20, to avoid building the air pressure in the compressed air tank 20 substantially beyond the pressure needed to operate other auxiliary equipment on the refueling cart 10.

Therefore, low air pressure in the compressed air tank 20 causes the variable-flow valve 32 to maximize restriction of fuel flow through the valve 32. The maximum constriction of the flow of fuel through the valve 32 causes maximum operation of the air compressor 18 to increase the air pressure in the compressed air tank 20. When the air pressure in the compressed air tank 20 is high enough, the needle valve 92 is open wide enough to maximize fuel flow through the restriction 82. Maximum fuel flow through the restriction 82 results in minimum pressure above the lower face 70 of the piston 72, opening the valve 32. The wide open valve 32 results in a minimum of fuel flowing through the hydraulic motor 16 and minimum operation of the air compressor 18.

In this way, the feedback of pressure from the compressed air tank 20 to the bleed valve 84 controls the variable-flow valve 32 to force just enough fuel to flow through the hydraulic motor 16 to maintain the air pressure in the compressed air tank 20 between a desired minimum pressure and a desired maximum pressure without regularly blowing off excess compressed air with an air overpressure safety valve (not shown).

While the form of apparatus herein described constitutes a preferred embodiment of this invention, it is to be understood that the invention is not limited to this precise form of apparatus, and that changes may be made therein without departing from the scope of the invention which is defined in the appended claims.

I claim:

1. A portable device for refueling self-propelled vehicles from a fixed, pressurized fuel source, including a source of auxiliary mechanical power derived from the flowing, pressurized fuel, comprising:

a variable-flow valve, having a structure which includes a variable-constriction region, through which a bulk of the pressurized fuel flows, for generating a pressure difference, the flow through the valve being variable so as to generate substantial pressure difference of the fuel flowing through the variable-flow valve by selectively restricting fuel flow;

means for allowing fuel to bypass the valve;

a fluid motor connected into the bypass means and driven by the fuel bypassing the variable-flow valve under pressure from the pressure difference generated by the fuel flowing through the variable-flow valve, said fluid motor producing mechanical output power in response to the flowing fuel;

an auxiliary instrumentality, on the portable device, for utilizing the mechanical output power of the fluid motor; and a feedback connection from the auxiliary instrumentality for bleeding back a parameter of the auxiliary instrumentality for controlling the variable-flow valve so as to vary the pressure difference generated by the fuel flowing through the valve.

2. A portable device according to claim 1 wherein the auxiliary instrumentality is an air compressor.

3. A portable device according to claim 2 wherein the feedback connection comprises a coupling of air compressed by the air compressor to the variable-flow valve to control its restriction of the flow of fuel through the valve, and thus control the output speed of the fluid motor in response to the pressure of the compressed air.

4. A portable device according to claim 3 wherein the restriction of the flow of fuel through the variable-flow valve is increased by a reduction in the pressure of the compressed air and the restriction of the flow of fuel through the variable-flow valve is decreased by an increase in the pressure of the compressed air.

5. An auxiliary mechanical power source for a portable refueling device which conveys fuel from a pressurized fuel source to refuel self-propelled vehicles comprising:

motor means for generating mechanical power in response to the flow of fuel from an input to an output of said motor means;

pressure generating means located in the fuel conveyance path for generating a variable pressure difference within the fuel in response to the flow of fuel through the pressure generating means;

source means for conveying fuel from the higher pressure side of the pressure generating means to said motor means;

sink means for conveying fuel from said motor means to the lower-pressure side of the pressure generating means; and feedback signal means for feeding back to the pressure generating means a functional parameter of the result of the generation of mechanical power for controlling the generating of pressure difference of the fuel between the source means and the sink means.

6. An auxiliary mechanical power source for a portable refueling device according to claim 5, wherein said pressure generating means comprises a variable-flow valve located in the fuel conveyance path of the portable refueling device.

7. An auxiliary mechanical power source for a portable refueling device according to claim 6, wherein the variation of the variable-flow valve is controlled by the feedback signal.

8. An auxiliary mechanical power source for a portable refueling device according to claim 7, wherein the variable-flow valve is arranged to increase constriction of the flow of fuel therethrough in response to a decrease in the feedback signal and to decrease the constriction of the flow of fuel in response to the increase in the feedback signal.

9. An auxiliary mechanical power source for a portable refueling device according to claim 8, wherein the mechanical power source rotates a shaft which operates an air compressor, and the feedback signal is the pressure of the compressed air.

10. An auxiliary mechanical power source for a portable refueling device according to claim 6, wherein said source means comprises a pipe extending from upstream of the variable-flow valve to the input of the motor means.

11. An auxiliary mechanical power source for a portable refueling device according to claim 10, wherein said sink means comprises a pipe extending from downstream of the variable-flow valve to the output of the motor means.

* * * * *